(12) United States Patent
Zhuang

(10) Patent No.: US 12,443,624 B2
(45) Date of Patent: Oct. 14, 2025

(54) DATA PROCESSING METHOD, SYSTEM, DEVICE, COMPUTER PROGRAM PRODUCT, AND STORAGE MEDIUM

(71) Applicant: HANGZHOU ALICLOUD FEITIAN INFORMATION TECHNOLOGY CO., LTD., Hangzhou (CN)

(72) Inventor: Zechao Zhuang, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/573,942

(22) PCT Filed: Jun. 30, 2022

(86) PCT No.: PCT/SG2022/050457
§ 371 (c)(1),
(2) Date: Dec. 22, 2023

(87) PCT Pub. No.: WO2023/277819
PCT Pub. Date: Jan. 5, 2023

(65) Prior Publication Data
US 2024/0289352 A1    Aug. 29, 2024

(30) Foreign Application Priority Data

Jul. 2, 2021  (CN) .......................... 202110751374.7

(51) Int. Cl.
*G06F 16/27* (2019.01)
*G06F 16/23* (2019.01)
*G06F 16/2458* (2019.01)

(52) U.S. Cl.
CPC ........ *G06F 16/275* (2019.01); *G06F 16/2358* (2019.01); *G06F 16/2474* (2019.01)

(58) Field of Classification Search
CPC ............... G06F 16/275; G06F 16/2358; G06F 16/2474; G06F 16/215; G06F 16/23; G06F 16/284
See application file for complete search history.

(56) References Cited

U.S. PATENT DOCUMENTS 5,897,660 A  *  4/1999  Reinders ............... G06F 12/023
                                                    711/170
8,086,580 B2 * 12/2011  Sachedina ........... G06F 16/2343
                                                    707/704
(Continued)

FOREIGN PATENT DOCUMENTS

CN     109313637     2/2019
CN     110019066     7/2019
(Continued)

OTHER PUBLICATIONS

English Translation of International Search Report for International PCT Patent Application No. PCT/SG2022/050457 issued Feb. 16, 2023 (3 pages).
(Continued)

*Primary Examiner* — Jared M Bibbee
(74) *Attorney, Agent, or Firm* — Wolf, Greenfield & Sacks, P.C.

(57) ABSTRACT

A data processing method, a database system, and an electronic device are disclosed. The method includes: generating a copy page when a data page does not satisfy a condition for writing into a disk; wherein the copy page includes: a first sequence identifier of a log corresponding to modification of the data page at a first time, a second sequence identifier of a log corresponding to modification of the data page at a second time, and data information of the data page after multiple modifications over a period from the first time to the second time, the first time being earlier than the second time; and executing an operation of updating the first sequence identifier corresponding to the data page in the
(Continued)

disk to the second sequence identifier when the copy page satisfies the condition for writing into the disk.

13 Claims, 3 Drawing Sheets

(56) References Cited

U.S. PATENT DOCUMENTS

| | | | | |
|---|---|---|---|---|
| 11,182,372 | B1* | 11/2021 | Jain | G06F 11/1464 |
| 11,494,408 | B2* | 11/2022 | Chainani | G06F 16/2358 |
| 2015/0347289 | A1* | 12/2015 | Ma | G06F 11/1446 |
| | | | | 711/103 |
| 2019/0370124 | A1* | 12/2019 | Sadavarte | G06F 11/1446 |
| 2020/0226100 | A1* | 7/2020 | Li | G06F 16/156 |
| 2020/0249878 | A1* | 8/2020 | Bismuth | G06F 3/0626 |
| 2021/0089556 | A1* | 3/2021 | Chainani | G06F 16/273 |
| 2021/0109665 | A1* | 4/2021 | Thimbleby | G06F 3/0608 |
| 2021/0141770 | A1* | 5/2021 | Wang | G06F 16/185 |

FOREIGN PATENT DOCUMENTS

| | | |
|---|---|---|
| CN | 112182010 | 1/2021 |
| CN | 112506941 | 3/2021 |
| CN | 112835528 | 5/2021 |

OTHER PUBLICATIONS

Notification of the First Office Action issued Mar. 29, 2025 in corresponding Chinese Patent Application No. 202110751374.7 (16 pages).

* cited by examiner

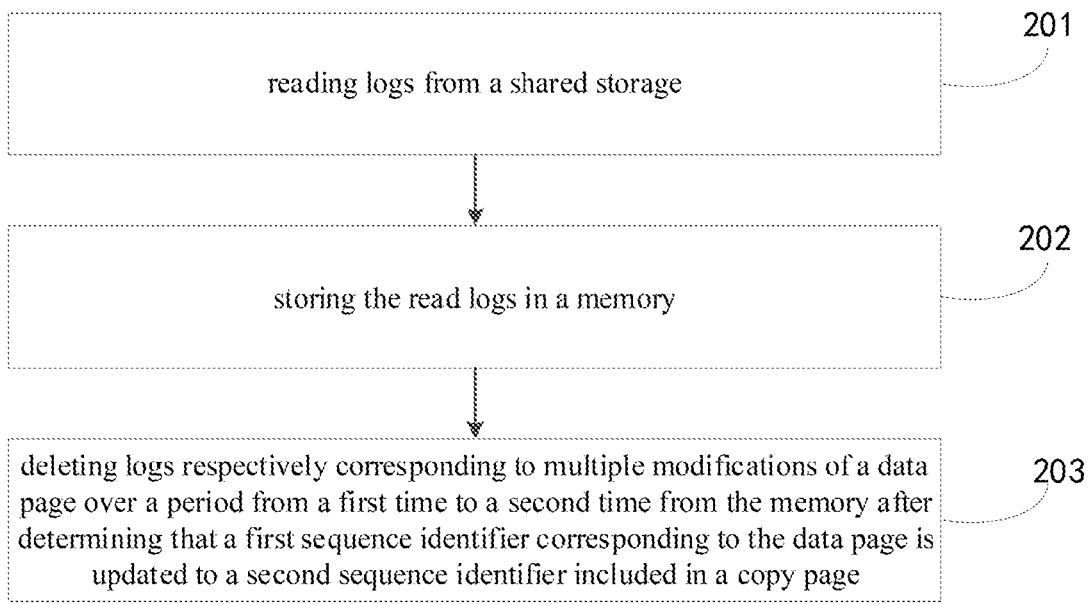
FIG. 3
FIG. 4
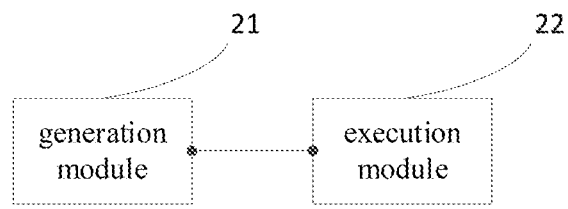
FIG. 5

DATA PROCESSING METHOD, SYSTEM, DEVICE, COMPUTER PROGRAM PRODUCT, AND STORAGE MEDIUM

This application claims priority to and is a national stage application of International Application Number: PCT/SG2022/050457 filed Jun. 30, 2022 which in turn claims priority to Chinese Application Number 202110751374.7 filed Jul. 2, 2021, the disclosures of each of the priority applications being incorporated by reference herein in its entirety as part of the present application.

TECHNICAL FIELD

The present application relates to the field of computer technology, and in particular to a data processing method, system, and device, a computer program product, and a storage medium.

BACKGROUND

With the development of cloud-native database technology, an increasing number of users are participating in cloud technology. Users' requirements for data processing capacity, processing speed, and other performances of a database are also gradually increasing.

If data of a certain data page is modified on a read-write node in a database, but the data page in a disk is not updated timely and synchronously, it will result in the inconsistency between the data of the data page on the read-write node and the data of the data page in the disk, and this data page is referred to as a dirty page. In order to ensure the consistency between the data of the data page in the disk and in the memory of the read-write node, it is necessary to perform flush page processing for this data page, that is, an operation of persistently writing the modified data from the memory of the read-write node to the disk. However, in practical applications, there may be various reasons that prevent the flush page processing for the data page, then resulting in thread blocking and directly affecting the performance of the database.

SUMMARY

To solve or improve the problems existing in the prior art, various embodiments of the present application provide a data processing method, a database system, an electronic device, a computer program product, and a computer-readable storage medium.

In one embodiment of the present application, a data processing method is provided. This method is applicable to a read-write node, specifically including:
    generating a copy page when a data page does not satisfy a condition for writing into a disk; wherein the copy page includes: a first sequence identifier of a log corresponding to modification of the data page at a first time, a second sequence identifier of a log corresponding to modification of the data page at a second time, and data information of the data page after multiple modifications over a period from the first time to the second time; and the first time is earlier than the second time; and
    executing an operation of updating the first sequence identifier corresponding to the data page in the disk to the second sequence identifier when the copy page satisfies the condition for writing into the disk.

In another embodiment of the present application, a data processing method is provided. This method is applicable to a read-only node, specifically including:
    reading logs from a shared storage;
    storing the read logs in a memory; and
    deleting, from the memory, logs respectively corresponding to multiple modifications of a data page over a period from a first time to a second time after determining that a first sequence identifier corresponding to the data page is updated to a second sequence identifier included in a copy page;
    wherein the copy page is generated when the data page does not satisfy a condition for writing into a disk, the copy page including: the first sequence identifier of a log corresponding to modification of the data page at the first time, the second sequence identifier of a log corresponding to modification of the data page at the second time, and data information of the data page after multiple modifications over a period from the first time to the second time; and the first time is earlier than the second time.

In still another embodiment of the present application, a database system is provided. This database system includes:
    a read-write node, configured for generating a copy page when a data page does not satisfy a condition for writing into a disk; wherein the copy page includes: a first sequence identifier of a log corresponding to modification of the data page at a first time, a second sequence identifier of a log corresponding to modification of the data page at a second time, and data information of the data page after multiple modifications over a period from the first time to the second time; and the first time is earlier than the second time; and executing an operation of updating the first sequence identifier corresponding to the data page in the disk to the second sequence identifier when the copy page satisfies the condition for writing into the disk;
    a shared storage, having the disk, and configured for storing data pages and logs;
    a read-only node, configured for reading logs from the shared storage; storing the read logs in a memory; and deleting, from the memory, logs respectively corresponding to multiple modifications of the data page over the period from the first time to the second time after determining that the first sequence identifier corresponding to the data page is updated to the second sequence identifier included in the copy page.

In still another embodiment of the present application, an electronic device is provided. This electronic device includes: a memory and a processor; wherein at least one instruction, at least one program, a code set, or an instruction set is stored in the memory, and the at least one instruction, the at least one program, the code set, or the instruction set is loaded and executed by the processor to implement the steps in the above data processing method.

In still another embodiment of the present application, a computer program product is provided. This computer program product includes a computer program or instructions. When the computer program or instructions is executed by a processor, the processor is enabled to implement the steps in the above data processing method.

In still another embodiment of the present application, a computer-readable storage medium that stores a computer program is provided, the computer program capable of implementing the steps in the above data processing method when executed by a computer.

Usually, a data page that cannot satisfy a writing condition is a page as frequently modified (i.e., a hot page), and then a read-write node frequently receives a write request for this hot page. Because this write request has always been in a modified state, this data page cannot satisfy a condition for writing into a disk (i.e., disk write) all the time. To this end, in the technical solutions provided in the embodiments of the present application, when a data page does not satisfy the condition for writing into a disk (i.e., flush page), the mechanism of copy page is employed, and for the read-write node, this copy page is a page that is no longer modified, that is, a second sequence identifier of a log corresponding to modification at a second time is fixed, without any more addition. At this point, this copy page definitely can satisfy the condition for writing into the disk. Therefore, the progress of the read-write node in writing the data page into the disk (i.e., disk write) can be advanced, and correspondingly, a read-only node can also delete logs accumulated in a memory as soon as possible, enabling the same to have the capability of receiving new logs.

BRIEF DESCRIPTION OF THE DRAWINGS

In order to provide a clearer explanation of the technical solutions in the embodiments of the present application or in the prior art, a brief introduction will be made below to the drawings needed in describing the embodiments or the prior art. Obviously, the drawings in the following description are of some embodiments of the present application. For persons with ordinary skills in the art, other drawings may be further obtained according to these drawings without putting in any creative labor.

FIG. 3 is a flow chart of a data processing method provided in an embodiment of the present application;

FIG. 4 is a flow chart of a data processing method provided in another embodiment of the present application;

FIG. 5 is a schematic structural diagram of a data processing apparatus provided in an embodiment of the present application;

DETAILED DESCRIPTION

Figure 1:
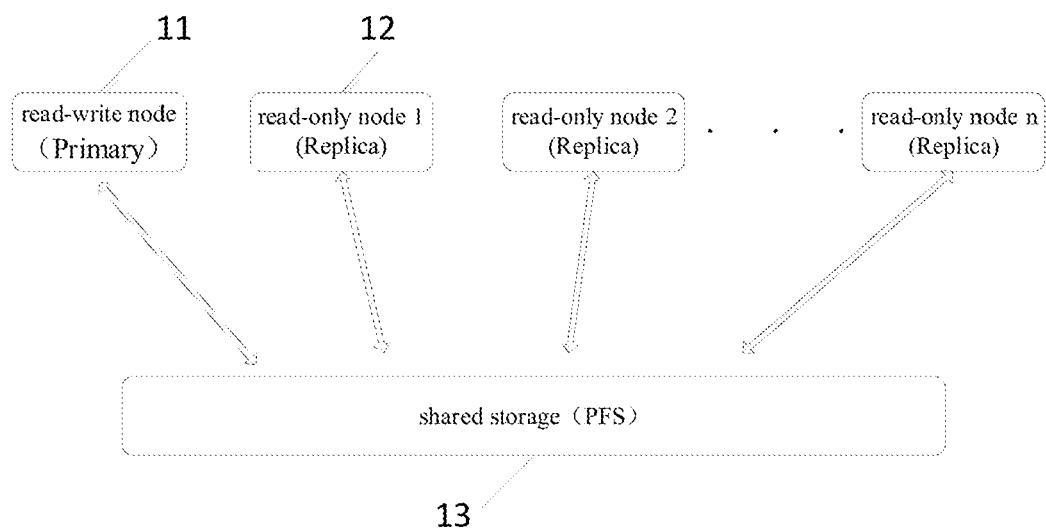
FIG. 1 is a schematic structural diagram of a database system provided in an embodiment of the present application.

In order to enable those skilled in the art to better understand the solutions of the present application, the technical solutions of the embodiments of the present application will be described below clearly and completely with reference to the drawings corresponding to the embodiments of the present application.

In some processes described in the description, claims, and the above drawings of the present application, a plurality of operations appearing in a particular sequence are included, and these operations may be executed in a sequence other than the sequence as described herein or in parallel. The serial numbers of the operations, such as 101, 102, etc., are only used to distinguish different operations, and the serial numbers themselves do not represent any sequence of execution. Additionally, these processes may include more or fewer operations, and these operations may be executed in sequence or in parallel. It should be explained that the expressions herein such as "first", "second", etc. are used to distinguish different messages, devices, modules, etc., which neither represent a sequence, nor limit that the "first" and the "second" are of different types. In addition, the embodiments described below are only some embodiments of the present application, not all of them. Based on the embodiments in the present application, all other embodiments obtained by those skilled in the art without creative labor shall fall within the scope of protection of the present application.

Prior to an introduction to the various embodiments of the present application, the nouns or terms etc. involved herein will be first explained briefly.

Shared storage refers to the same data storage used at an underlying level by different nodes in a database, so that in the architecture of shared storage, without increasing disk storage, it is possible to achieve better scalability of read request loads, quickly add and remove read-only nodes, and perform real-time high availability (HA) switching for read-only nodes and read-write nodes, greatly enhancing the availability of an instance.

Physical replication refers to the synchronization of primary and backup data achieved in a Mysql database through Redolog, which differs from the original binlog primary and backup synchronization mechanism, has better synchronization performance and lower synchronization delay, and is the core technology of PolarDB.

Redolog is a log, also known as a physical log, that records a physical modification to a data page and is used for updating the data page to a modified data page. Redolog (i.e., a log) includes a data page identifier, modified content, write time (or timestamp), etc.

Redolog apply is a process of using the Redolog to update a data page so as to update the data page to a modified data page.

Log sequence number (LSN) is a continuously incrementing LSN that represents the total number of logs having been generated from the installation of an instance to the current point, and position of a log can be calculated by LSN. When each data page is written into a disk (or disk write), the last modified LSN will also be recorded therein, so that during crash recovery, there is no need to apply those logs prior to that LSN.

Flush page refers to an operation where a read-write node in a database persistently writes a modified data page from a memory into a disk, and the flush page is generally performed for a data page in the memory by a backend thread of the read-write node periodically.

Hot page is a page in a database that has been constantly and frequently modified, indicating that there always has a user who requests for frequent updates on the same or consecutive data.

PolarDB database employs a one-write and multiple-read architecture to serve users. As shown in FIG. 1, the read-write node is responsible for read-write requests, also known as a Primary node, and generates Redologs and persisted data pages. Both the generated Redologs and persisted data pages are stored in a shared storage PFS. There may be multiple read-only nodes, which are solely responsible for read requests, also known as Replica nodes. The read-only nodes update (or replay) data pages by reading the Redologs in the shared storage, updating data pages in their own buffer pool to the newest modified data pages, so that subsequent read requests can access the newest data timely.

In the architecture of PolarDB, to ensure the consistency of the data returned to a user when a read request from a user thread access a data page on a read-only node, the read-write node (Primary node), when performing flush page operation on data page P1, needs to ensure that the LSN of the Redolog for the newest modification of this data page P1 cannot exceed the minimum LSN of the applied Redologs on all read-only nodes, so as to avoid the user from accessing overly new data on the read-only node. Here, the applied Redologs may not necessarily be the Redolog of this data page P1. For example, suppose the database system shown in FIG. 1 includes a read-only node 1, a read-only node 2, and a read-only node n. A Redolog with LSN being a is applied on read-only node 1 to update a data page P2; a Redolog with LSN being b is applied on read-only node 2 to update a data page P3; a Redolog with LSN being c is applied on read-only node n to update data page P1, wherein a<b<c. At this point, the read-write node needs to ensure that the LSN for the newest modification of this data page P1 cannot exceed the LSN=a of the Redolog applied on read-only node 1.

Therefore, in order to ensure that disk data always remains in a consistent state, the read-write node must consider the LSNs of the Redologs applied on all read-only nodes when performing flush page for a certain data page, and the LSN of a Redolog applied by a read-only node is used to complete the disk write of data.

The minimum LSN of the Redologs applied on all read-only nodes is defined as a safe LSN. When the read-write node performs the flush page processing for this data page P1, it is necessary to ensure that an LSN (new_modification_lsn) of a Redolog for the newest modification of this data page P1 is less than the safe LSN. Otherwise, flush page and disk write cannot be performed for this data page P1, which may cause that data page P1 on the read-write node cannot be flushed timely and the oldest modified LSN (oldest_flush lsn) cannot be advanced.

While on the read-only node, a mechanism of Runtime Apply is added in order to accelerate the synchronization efficiency of physical replication. Runtime Apply refers to that when a Redolog is applied, if data page P1 is not in a memory (specifically in a buffer pool, for example), the corresponding Redolog will not be applied to update (or replay) this data page P1, preventing a backend apply thread on the read-only node from frequently reading data page P1 from a shared storage, but it is still necessary to buffer a parsed Redolog corresponding to this data page P1, that is, to store the same in a memory (specifically in a parse buffer, for example), to facilitate reading of the corresponding data page P1 from the shared storage when a read request from a subsequent user arrives, and all Redologs modified for this data page P1 as buffered in a memory (specifically in a parse buffer, for example) are applied through Runtime Apply to ultimately return to the newest data page. The Redologs buffered in a memory (specifically in a parse buffer, for example) can be cleaned up only after the oldest_flush_lsn has been advanced on the read-write node, which means that when data page P1 corresponding to this segment of modified Redologs has already been written into a disk, and then this segment of Redologs may be discarded.

Under such constraint, if a hot page is updated (i.e., new_modification_lsn is updated ceaselessly) or flush page is too slow on a read-write node, it will cause a large number of parsed Redologs of this hot page to accumulate in the parse buffer of a read-only node, and meanwhile will affect the performances of the parse buffer and Redolog apply of the read-only node, causing a too slow advancement of the LSN of the Redolog applied on the read-only node, which in turn will further hinder flush page in the read-write node, ultimately affecting the writing operation of a user thread. If the speed of applying Redolog is slow to a certain extent on the read-write node, it will cause a widening gap between the speed of applying Redolog and the speed of generating Redolog by the read-write node, resulting in a continuous increase in replication delay.

Just as mentioned above, when a read-write node is performing flush page for a certain data page, it is required that the LSN of the Redolog corresponding to the newest modification of the data page written into disk cannot exceed the safe LSN. When a data page is frequently updated, the LSN (newest_modification_lsn) of the Redolog for the newest modification of this data page is continuously updated, and it never satisfies the condition for flush page (i.e., always greater than the safe LSN). As a result, this data page cannot be written into the disk data file, and thus the flushing of the LSN cannot be advanced. The ultimate result is that the Redologs of the read-only node accumulate in a memory (specifically in a buffer pool, for example) to leave no buffer for receiving new write requests.

To solve this problem, the technical solutions provided in various embodiments of the present application introduce copy page technology. Copy page is one copy page of data as temporarily generated when a data page, under an architecture similar to PolarDB, that is, one-write and multiple-read architecture, cannot be timely written into the disk data file since it does not satisfy a flush page condition. This copy page includes all data in the data page, the LSN for the oldest modification, the LSN for the newest modification, etc. This will enable the data page to satisfy the flush page condition to advance the flush page process of the data page.

Figure 2:
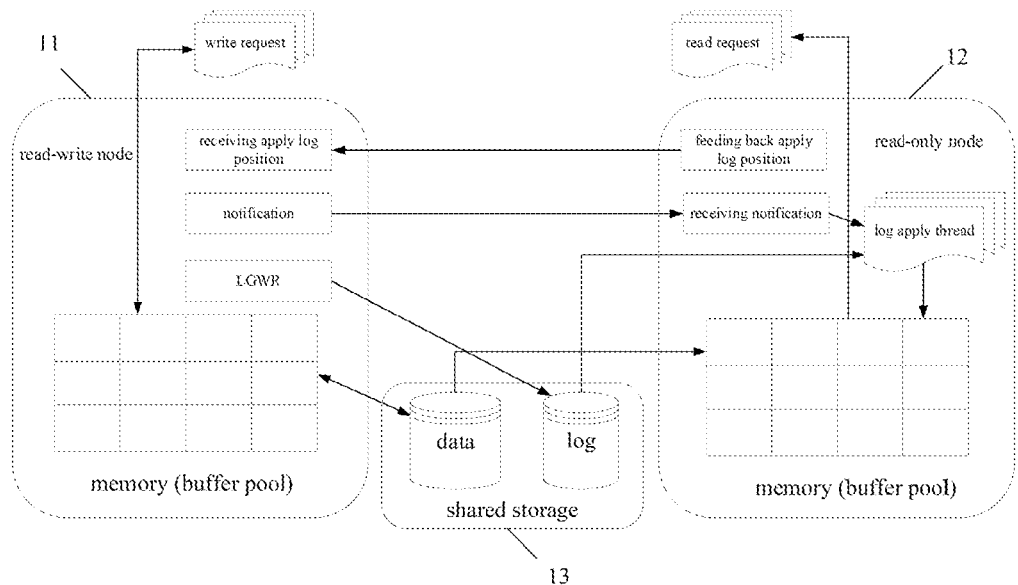
FIG. 2 is a schematic structural diagram of another representation of the database system provided in an embodiment of the present application.

FIGS. 1 and 2 show a schematic structural diagram of a database system provided in an embodiment of the present application. As shown in the figures, the database system includes:

a read-write node 11, configured for generating a copy page when a data page does not satisfy a condition for writing into a disk; wherein the copy page includes: a first sequence identifier of a log corresponding to modification of the data page at a first time, a second sequence identifier of a log corresponding to modification of the data page at a second time, and data information of the data page after multiple modifications over a period from the first time to the second time; and the first time is earlier than the second time; and executing an operation of updating the first sequence identifier corresponding to the data page in the disk to the second sequence identifier when the copy page satisfies the condition for writing into the disk;

a shared storage 13, having the disk, and configured for storing data pages and logs;

a read-only node 12, configured for reading logs from the shared storage; storing the read logs in a memory; and deleting logs respectively corresponding to multiple modifications of the data page over a period from a first time to a second time from the memory after determining that the first sequence identifier corresponding to the data page is updated to the second sequence identifier included in the copy page.

There may be multiple read-only nodes 12, so as to offer data reading service to multiple users. For example, in a specific implementation, the database system described in this embodiment may further include apparatuses, devices, or modules responsible for load balancing, read-write distribution, and other functions. For example, the database system described in this embodiment may further include an intermediate layer device that, upon receiving multiple read and/or write requests from users, categorizes and sends the read and write requests, so as to send the write requests to read-write nodes and send the read requests to read-only nodes. If there are multiple read requests, they may be distributed to different read-only nodes according to the load balancing principle.

The database node described in this embodiment may be a database system with PolarDB architecture. As shown in FIG. 2, in the database system with PolarDB architecture, the read-write node and the read-only node synchronize states of memory through physical replication. Due to the relatively small amount of synchronized data, the probability of replication delay is much lower compared to traditional MySQL replication. Next, a brief introduction will be made to the process of physical replication.

A Primary node (i.e., a read-write node) periodically sends a notification to a Replica node (i.e., a read-only node) to inform the Replica node of the upper limit of the log position that can be safely read (i.e., the maximum sequence identifier of the readable logs). During this period, the Replica node may safely read logs below this position. If this position is exceeded, it may read a log that the Primary node is currently writing. The Replica node periodically provides feedback on positions of logs applied to indicate the maximum sequence identifier of the log it has applied, and then those below this position must have already been applied, while those beyond this position may not have been applied or are currently being applied. The difference between the position of a log being currently written by the Primary node and the position applied by the Replica node is replication delay. If the replication delay is very significant, it will cause the Replica node to fall behind the Primary node.

In FIG. 2, the log writer (LGWR) in read-write node 11 writes all logs in a log buffer to corresponding log files in the disk in the shared storage. This log writing process automatically starts when an instance is started.

The disk stores a first sequence identifier corresponding to the data page. For example, the first sequence identifier is included in the data page. At this point, when the copy page satisfies the condition for writing into the disk, the read-write node executes the operation of updating the data page in the disk to the copy page, so as to complete both an identifier update operation and a data information update operation (also known as a data disk write operation). The identifier update operation is an operation of updating the first sequence identifier corresponding to the data page to the second sequence identifier. This identifier update operation allows a read-only node to delete the accumulated logs in a memory as soon as possible, enabling the same to have the capability of receiving new logs. The data information update operation (also known as a data disk write operation) is an operation of updating the data information of the data page in the disk to the data information included in the copy page. This data information update operation advances the progress of writing the data page into the disk (i.e., disk write).

The functions and interaction processes of various constituent units in this system embodiment, such as read-write node 11, read-only node 12, and shared storage 13, may be referred to the following description of various method embodiments.

FIG. 3 shows a flow chart of a data processing method provided in an embodiment of the present application. The method provided in this embodiment is applicable to or performed by the read-write node in the above database system. Specifically, the method includes:

Step 101: generating a copy page when a data page does not satisfy a condition for writing into a disk; wherein the copy page includes: a first sequence identifier of a log corresponding to modification of the data page at a first time, a second sequence identifier of a log corresponding to modification of the data page at a second time, and data information of the data page after multiple modifications over a period from the first time to the second time; and the first time is earlier than the second time.

Step 102: executing an operation of updating the first sequence identifier corresponding to the data page in the disk to the second sequence identifier when the copy page satisfies the condition for writing into the disk.

In the above step 101, the data page may be a hot page with a write request frequency greater than a preset frequency.

Assuming that the read-write node consecutively and continuously receives write requests for data page P1, the read-write node continuously modifies P1 according to the received write requests, generates a corresponding log for each modification, and assigns a sequence identifier (e.g., LSN, a self-increasing serial number) to each log. For example, as listed below in Table 1, the data pages and logs corresponding to P1 as modified after each write request are:

TABLE 1

| | write request 1 | write request 2 | write request 3 | write request 4 | write request 5 | ... |
|---|---|---|---|---|---|---|
| Modified Data Page | $P1_1$ | $P1_2$ | $P1_3$ | $P1_4$ | $P1_5$ | ... |
| Log | Log 1 | Log 2 | Log 3 | Log 4 | Log 5 | ... |

The identifiers 1, 2, 3, 4, 5 . . . following the logs are the corresponding sequence numbers (i.e., LSN) for the logs.

If write requests for data page P1 are still continuously received, data page P1 will need to be continuously modified, the LSN of the log for the newest modification will be continuously updated, and this data page P1 cannot satisfy the condition for writing into a disk (flush page or disk write) all the time. To this end, in step 101 of this embodiment, a copy page is generated for the data page. For example, in an example shown in the table above, one copy page is generated, which includes a first sequence identifier (e.g., LSN=1) corresponding to a log for modification of data page P1 at a first time, a second sequence identifier (e.g., LSN=5) corresponding to a log for modification of data page P1 at a second time, and data information of the data page after multiple modifications over a period from the first time to the second time (i.e., the data information of data page $P1_5$). This copy page is considered as a page that is no longer modified, that is, the second sequence identifier corresponding to the log for modification of the copy page at the second time is fixed, without any more variation. At this point, it is determined that the copy page must satisfy the condition for writing into the disk.

In this embodiment, the operation of updating the first sequence identifier corresponding to the data page in the disk to the second sequence identifier may advance the progress of the read-only node in deleting the accumulated logs in its memory, enabling the same to have the capability of receiving new logs without affecting its performance. Essentially, in addition to updating the corresponding first sequence identifier in the disk to the second sequence identifier, the data page in the disk may also be updated to the copy page to complete the data information update operation. That is, the method provided in this embodiment may further include the following step:

updating the data page in the disk to the copy page to complete a data information update operation;

wherein the data information update operation refers to an operation of updating data information included in the data page in the disk to the data information included in the copy page.

In a specific implementation, if a data page stored in a disk (i.e., a disk in the shared storage) includes a sequence identifier (e.g., the first sequence identifier included in the data page, as mentioned in this embodiment), the data page including the first sequence identifier in the disk may be directly updated to the copy page. In simple terms, the data page including the first sequence identifier in the disk is directly replaced with the copy page. At this point, the data information and the LSN about the data page in the disk are changed to the data information and the second sequence identifier (i.e., the newest modified LSN of the copy page, newest_modification_lsn) included in the copy page, thereby advancing the progress of the read-write node in writing the data page into the disk. That is, the data page stored in the disk is changed to the data information after modification at the second time, completing the disk write of the data page. At the same time, because the first sequence identifier corresponding to the data page is updated to the second sequence identifier, the read-only node may delete the accumulated logs in its memory as soon as possible, enabling the same to have the capability of receiving new logs and maintain good performance.

In the example shown in Table 1 above, another copy page may be further generated (referred to as a replica page below to distinguish the same from the copy page above), and this replica page includes a third sequence identifier (e.g., LSN=6) corresponding to a log for modification of data page P1 at a third time, and a fourth sequence identifier (e.g., LSN=10) corresponding to a log for modification of data page P1 at a fourth time, and data information of data page P1 after multiple modifications over a period from the third time to the fourth time (i.e., the data information of data page P110). Then, an operation of updating the copy page including the second sequence identifier in the disk to the replica page is executed.

It can be seen that by employing the method provided in the present embodiments, when a backend write-into-disk (or flush page or disk write) thread of the read-write node performs a check and finds that a data page does not satisfy a check condition, the present embodiments provide a copy page mechanism. Because the data page has always been in a state of being frequently modified, it will fall into the situation where flush page or disk write cannot be performed for a long time. However, by creating a copy page for the data page, the second sequence identifier of a log corresponding to the newest modification of this copy page is fixed. Therefore, in subsequent checks, this copy page can satisfy the check condition to perform persistent disk write, and drive the read-write node to advance the progress of writing the data page into the disk, alleviating the problems such as log accumulation in a memory that affects the performance of the read-only node due to the data page being unable to be written into the disk timely. With this copy page mechanism, even more frequent modifications will not affect the stability of the database system, enhancing the stability of the database system.

It should be added that the concept of data page is employed to describe the present application. In practice, the structure of data storage varies for databases of different architectures, and the corresponding data names in the present embodiments will also be different. The data page in the present embodiments may be replaced with nouns such as data set, data item, data group, etc., which is not specifically limited in the present embodiments.

Optionally, the method provided in the present embodiments may further include following steps (not shown in FIG. 3):

Step 103: acquiring sequence identifiers of logs applied by at least one read-only node;

Step 104: determining a safe sequence identifier according to the sequence identifiers of the logs applied by the at least one read-only node; and Step 105: the copy page satisfying a condition for writing into a disk when the second sequence identifier is less than or equal to the safe sequence identifier.

In the above step 104, "determining a safe sequence identifier according to the sequence identifiers of the logs applied by the at least one read-only node" specifically may be:

determining a minimum sequence identifier according to the sequence identifiers of the logs applied by the at least one read-only node; and using the minimum sequence identifier as the safe sequence identifier.

Optionally, the method provided in the present embodiments may further include following steps (not shown in FIG. 3):

Step 106: periodically sending read log position information to at least one read-only node, the read log position information including a maximum sequence identifier among sequence identifiers of logs readable by the read-only node from a shared storage; and Step 107: periodically receiving apply log position information fed back from the at least one read-only node, the apply log position information including sequence identifiers of logs applied by the read-only node.

Further, the method provided in the present embodiments may further include following steps (not shown in FIG. 3):

Step 108: receiving a write request for the data page;

Step 109: modifying the data page in a memory and generating a corresponding log according to the write request;

Step 110: assigning a sequence identifier to the log; and

Step 111: sending the log to a disk of a shared storage for storage.

FIG. 4 shows a flow chart of a data processing method provided in another embodiment of the present application. The execution subject of the method provided in this embodiment may be a read-only node in the above database system. Specifically, the method includes:

Step 201: reading logs from a shared storage;

Step 202: storing the read logs in a memory; and

Step 203: deleting logs respectively corresponding to multiple modifications of a data page over a period from a first time to a second time from the memory after determining that a first sequence identifier corresponding to the data page is updated to a second sequence identifier included in a copy page;

wherein the copy page is generated when the data page does not satisfy a condition for writing into a disk, the copy page including: the first sequence identifier of a log corresponding to modification of the data page at the first time, the second sequence identifier of a log corresponding to modification of the data page at the second time, and data information of the data page after multiple modifications over the period from the first time to the second time period; and the first time is earlier than the second time.

The content about generation of a copy page and how to update a data page in a disk by utilizing the copy page may be referred to the corresponding content in the above embodiments, which will not be elaborated here.

Optionally, the method provided in this embodiment may further include following steps (not shown in FIG. 4):

Step 204: receiving a read request for the data page;

Step 205: applying a log stored in the memory corresponding to modification of the data page at a third time to modify the data page; wherein the third time is later than the second time; and Step 206: providing, in response to the read request, feedback on the modified data page.

FIG. 5 shows a schematic structural diagram of a data processing apparatus provided in an embodiment of the present application. As shown in FIG. 5, the apparatus includes a generation module 21 and an execution module 22.

The generation module 21 is configured for generating a copy page when a data page does not satisfy a condition for writing into a disk; wherein the copy page includes: a first sequence identifier of a log corresponding to modification of the data page at a first time, a second sequence identifier of a log corresponding to modification of the data page at a second time, and data information of the data page after multiple modifications over a period from the first time to the second time; and the first time is earlier than the second time.

The execution module 22 is configured for executing an operation of updating the first sequence identifier corresponding to the data page in the disk to the second sequence identifier when the copy page satisfies the condition for writing into the disk.

Further, the execution module 22 is further configured for updating the data page in the disk to the copy page to complete a data information update operation.

The data information update operation refers to an operation of updating data information included in the data page in the disk to the data information included in the copy page.

Further, the apparatus described in this embodiment may further include an acquisition module and a determination module. The acquisition module is configured for acquiring sequence identifiers of logs applied by at least one read-only node. The determination module is configured for determining a safe sequence identifier according to the sequence identifiers of the logs applied by the at least one read-only node; and the copy page satisfying the condition for writing into the disk when the second sequence identifier is less than or equal to the safe sequence identifier.

Further, the determination module is specifically configured for determining a minimum sequence identifier according to the sequence identifiers of the logs applied by the at least one read-only node; and using the minimum sequence identifier as the safe sequence identifier.

Further, the apparatus provided in this embodiment may further include a transceiver module. This transceiver module is configured for periodically sending read log position information to at least one read-only node, the read log position information including a maximum sequence identifier among sequence identifiers of logs readable by the read-only node from a shared storage; and periodically receiving apply log position information fed back from the at least one read-only node, the apply log position information including sequence identifiers of logs applied by the read-only node.

Further, the apparatus provided in this embodiment further includes a processing module. The transceiver module is configured for receiving a write request for the data page. The processing module is configured for modifying the data page in a memory and generating a corresponding log according to the write request; assigning a sequence identifier to the log; and sending the log to a disk of a shared storage for storage.

Further, the data page is a hot page with a write request frequency greater than a preset frequency.

It should be noted that the apparatus provided in the above embodiment may implement the technical solutions described in the above various method embodiments, and the specific implementation principles of the above modules or units may be referred to the corresponding content in the above various method embodiments, and will not be repeated here.

Figure 6:
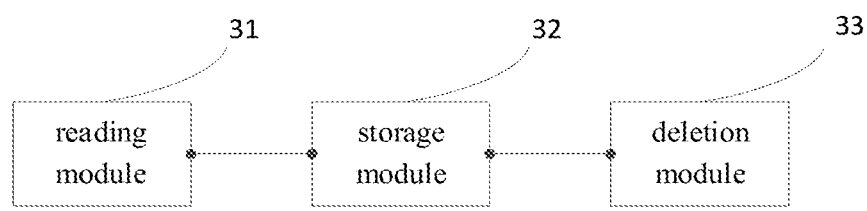
FIG. 6 is a schematic structural diagram of a data processing apparatus provided in another embodiment of the present application.

FIG. 6 shows a schematic structural diagram of a data processing apparatus provided in another embodiment of the present application. As shown in the figure, the apparatus includes a reading module 31, a storage module 32, and a deletion module 33.

The reading module 31 is configured for reading logs from a shared storage.

The storage module 32 is configured for storing the read logs in a memory.

The deletion module 33 is configured for deleting logs respectively corresponding to multiple modifications of a data page over a period from a first time to a second time from the memory after determining that a first sequence identifier corresponding to the data page is updated to a second sequence identifier included in a copy page.

The copy page is generated when the data page does not satisfy a condition for writing into a disk, the copy page including: the first sequence identifier of a log corresponding to modification of the data page at the first time, the second sequence identifier of a log corresponding to modification of the data page at the second time, and data information of the data page after multiple modifications over the period from the first time to the second time period; and the first time is earlier than the second time.

Further, the apparatus provided in this embodiment may further include a receiving module, a modification module, and a feedback module. The receiving module is configured for receiving a read request for the data page. The modification module is configured for applying a log stored in the memory corresponding to modification of the data page at a third time to modify the data page; wherein the third time is later than the second time; and the feedback module is configured for providing, in response to the read request, feedback on the modified data page.

It should be noted that the apparatus provided in the above embodiment may implement the technical solutions described in the above various method embodiments, and the specific implementation principles of the above modules or units may be referred to the corresponding content in the above various method embodiments, and will not be repeated here.

Figure 7:
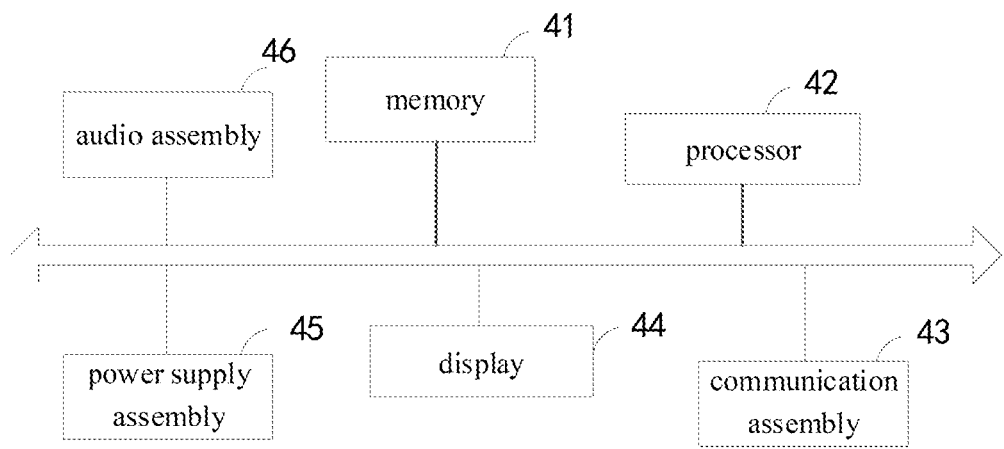
FIG. 7 is a schematic structural diagram of an electronic device provided in an embodiment of the present application.

The present application further provides an electronic device, as shown in FIG. 7, including a processor 42 and a memory 41, wherein at least one instruction, at least one program, a code set, or an instruction set is stored in the memory, and the at least one instruction, the at least one program, the code set, or the instruction set is loaded and executed by the processor for:

generating a copy page when a data page does not satisfy a condition for writing into a disk; wherein the copy page includes: a first sequence identifier of a log corresponding to modification of the data page at a first time, a second sequence identifier of a log corresponding to modification of the data page at a second time, and data information of the data page after multiple modifications over a period from the first time to the second time; and the first time is earlier than the second time; and executing an operation of updating the first sequence identifier corresponding to the data page included in the disk to the second sequence identifier when the copy page satisfies the condition for writing into the disk.

The above memory 41 may be configured to store various other data to support operations on the electronic device. Examples of these data include instructions for any application or method to operate on the electronic device. The memory 41 may be implemented by any type of volatile or non-volatile storage devices or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

When executing the program in the memory 41, the above processor 42 may further implement other functions in addition to the above functions, which may be referred to the descriptions of the previous embodiments for specific details.

Further, as shown in FIG. 7, the electronic device further includes a communication assembly 43, a display 44, a power supply assembly 45, an audio assembly 46, and other assemblies. FIG. 7 only shows some assemblies for exemplary purposes, which does not mean that the electronic device only includes the assemblies shown in FIG. 7. In a specific implementation, the electronic device provided in this embodiment may be a read-write node in a database system.

Another embodiment of the present application provides an electronic device having a structure the same as FIG. 7. Specifically, the electronic device includes a processor and a memory, wherein at least one instruction, at least one program, a code set, or an instruction set is stored in the memory, and the at least one instruction, the at least one program, the code set, or the instruction set is loaded and executed by the processor for:

reading logs from a shared storage;

storing the read logs in a memory; and deleting logs respectively corresponding to multiple modifications of a data page over a period from a first time to a second time from the memory after determining that a first sequence identifier corresponding to the data page is updated to a second sequence identifier included in a copy page.

The copy page is generated when the data page does not satisfy a condition for writing into a disk, the copy page including: the first sequence identifier of a log corresponding to modification of the data page at the first time, the second sequence identifier of a log corresponding to modification of the data page at the second time, and data information of the data page after multiple modifications over a period from the first time to the second time; and the first time is earlier than the second time.

When executing a program in storage, the above processor may further implement other functions in addition to the above functions, which may be referred to the descriptions of the previous embodiments for specific details.

Correspondingly, an embodiment of the present application further provides a computer-readable storage medium that stores a computer program capable of implementing the steps or functions of the data processing methods provided in the above embodiments when executed by a computer.

An embodiment of the present application further provides a computer-readable storage medium that stores a computer program capable of implementing the steps or functions of the data processing methods provided in the above embodiments when executed by a computer.

The apparatus embodiments described above are merely exemplary, where the units described as separate components may or may not be physically separated, and the components displayed as units may or may not be physical units, that is, they may be located in one place, or may also be distributed to multiple network units. Some or all of the modules therein may be selected according to actual needs to achieve the purpose of the solutions of the present embodiments. Persons with ordinary skills in the art may understand and implement the solutions without putting in creative labor.

Through the description of the above implementations, those skilled in the art may clearly understand that the implementations may be achieved by means of software and necessary universal hardware platforms, and surely may also be achieved by hardware. Based on this understanding, the essence of the above technical solutions, or the part that makes a contribution over the prior art, may be embodied in the form of a software product. This computer software product may be stored in a computer readable storage medium, such as ROM/RAM, magnetic disk, optical disk, etc., including several instructions to enable a computer device (which may be a personal computer, a server, or a network device, etc.) to execute methods described in various embodiments or in certain parts of the embodiments.

Finally, it should be noted that the above embodiments are only used for illustrating, rather than limiting, the technical solutions of the present application. Although the present application has been described in detail with reference to the aforementioned embodiments, persons with ordinary skills in the art should understand that they may still make modifications to the technical solutions recorded in the aforementioned embodiments, or perform equivalent replacements with some of the technical features therein; while these modifications or replacements do not separate the essence of the corresponding technical solutions from the spirit and scope of the technical solutions of the various embodiments of the present application.

What is claimed is:

1. A data processing method, the method comprising, by a read-write node of a database system:

generating a temporary copy page when a data page does not satisfy a condition for writing into a disk; wherein the copy page comprises: a first sequence identifier of a log corresponding to modification of the data page at a first time, a second sequence identifier of a log corresponding to modification of the data page at a second time, and data information of the data page after a plurality of modifications over a period from the first time to the second time, the first time being earlier than the second time, and the second sequence identifier in the copy page being fixed without variation;

executing an operation of updating the first sequence identifier corresponding to the data page in the disk to the second sequence identifier in the copy page when the copy page satisfies the condition for writing into the disk, and replacing the data page in the disk with the copy page to complete a data information update operation; and wherein the data information update operation comprises an operation of replacing data information comprised in the data page in the disk with the data information comprised in the copy page.

2. The method according to claim 1, further comprising:
acquiring sequence identifiers of logs applied by at least one read-only node;
determining a safe sequence identifier according to the sequence identifiers of the logs applied by the at least one read-only node; and
the copy page satisfying the condition for writing into the disk when the second sequence identifier is less than or equal to the safe sequence identifier.

3. The method according to claim 2, wherein determining the safe sequence identifier according to the sequence identifiers of the logs applied by the at least one read-only node comprises:
determining a minimum sequence identifier according to the sequence identifiers of the logs applied by the at least one read-only node; and
using the minimum sequence identifier as the safe sequence identifier.

4. The method according to claim 2, further comprising:
periodically sending read log position information to the at least one read-only node, the read log position information comprising a maximum sequence identifier among sequence identifiers of logs readable by the at least one read-only node from a shared storage; and
periodically receiving apply log position information fed back from the at least one read-only node, the apply log position information comprising sequence identifiers of logs applied by the at least one read-only node.

5. The method according to claim 1, further comprising:
receiving a write request for the data page;
modifying the data page in a memory and generating a corresponding log according to the write request;
assigning a sequence identifier to the log; and
sending the log to a disk of a shared storage for storage.

6. The method according to claim 5, wherein the data page is a hot page with a write request frequency greater than a preset frequency.

7. A non-transitory computer-readable storage medium that stores a computer program that, when executed by a computer, is capable of implementing steps of the method of claim 1.

8. A data processing method, the method comprising, by a read-only node of a database system:
reading logs from a shared storage;
storing the read logs in a memory;
deleting, from the memory, logs respectively corresponding to a plurality of modifications of a data page over a period from a first time to a second time, after determining that a first sequence identifier corresponding to the data page is updated to a second sequence identifier comprised in a temporary copy page; and wherein the copy page is generated when the data page does not satisfy a condition for writing into a disk, the copy page comprising: the first sequence identifier of a log corresponding to modification of the data page at the first time, the second sequence identifier of a log corresponding to modification of the data page at the second time, and data information of the data page after the plurality of modifications over the period from the first time to the second time, the first time being earlier than the second time, and the second sequence identifier in the copy page being fixed without variation;

wherein the data page in the disk is replaced with the copy page when the copy page satisfies the condition for writing into the disk, to complete a data information update operation; and wherein the data information update operation comprises an operation of replacing data information comprised in the data page in the disk with the data information comprised in the copy page.

9. The method according to claim 8, further comprising:
receiving a read request for the data page;
applying a log stored in the memory corresponding to modification of the data page at a third time to modify the data page, wherein the third time is later than the second time; and
providing, in response to the read request, feedback on the modified data page.

10. An electronic device comprising:
a processor; and
a memory comprising at least one instruction, at least one program, a code set, or an instruction set wherein the at least one instruction, the at least one program, the code set, or the instruction set is configured to be loaded and executed by the processor to implement the data processing method of claim 8.

11. A non-transitory computer-readable storage medium that stores a computer program that, when executed by a computer, is capable of implementing steps of the method of claim 8.

12. A database system, comprising:
a read-write node configured for:
generating a temporary copy page when a data page does not satisfy a condition for writing into a disk, wherein the copy page comprises: a first sequence identifier of a log corresponding to modification of the data page at a first time, a second sequence identifier of a log corresponding to modification of the data page at a second time, and data information of the data page after a plurality of modifications over a period from the first time to the second time, the first time being earlier than the second time, and the second sequence identifier in the copy page being fixed without variation;
executing an operation of updating the first sequence identifier corresponding to the data page in the disk to the second sequence identifier in the copy page when the copy page satisfies the condition for writing into the disk; and
replacing the data page in the disk with the copy page to complete a data information update operation; and
wherein the data information update operation comprises an operation of replacing data information comprised in the data page in the disk with the data information comprised in the copy page;
a shared storage, having the disk, and configured for storing data pages and logs; and a read-only node, configured for:
  reading logs from the shared storage,
  storing the read logs in a memory, and
  deleting, from the memory, logs respectively corresponding to the plurality of modifications of the data page over the period from the first time to the second time after determining that the first sequence identifier corresponding to the data page is updated to the second sequence identifier comprised in the copy page.

13. An electronic device, comprising:
a processor; and
a memory comprising at least one instruction, at least one program, a code set, or an instruction set, wherein the at least one instruction, the at least one program, the code set, or the instruction set is configured to be loaded and executed by the processor to implement the data processing method of claim 1.

\* \* \* \* \*